United States Patent
Liu et al.

(10) Patent No.: US 7,962,487 B2
(45) Date of Patent: Jun. 14, 2011

(54) RANKING ORIENTED QUERY CLUSTERING AND APPLICATIONS

(75) Inventors: Qi Liu, Beijing (CN); Ruihua Song, Beijing (CN); Jiangming Yang, Beijing (CN)

(73) Assignee: Microsoft Corporation, Redmond, WA (US)

(*) Notice: Subject to any disclaimer, the term of this patent is extended or adjusted under 35 U.S.C. 154(b) by 383 days.

(21) Appl. No.: 12/345,645

(22) Filed: Dec. 29, 2008

(65) Prior Publication Data

US 2010/0169300 A1 Jul. 1, 2010

(51) Int. Cl.
*G06F 17/30* (2006.01)
(52) U.S. Cl. .......... 707/737; 707/E17.089; 707/E17.112
(58) Field of Classification Search .................. 707/737
See application file for complete search history.

(56) References Cited

U.S. PATENT DOCUMENTS

| | | | |
|---|---|---|---|
| 5,864,845 A | 1/1999 | Voorhees et al. | |
| 6,363,373 B1* | 3/2002 | Steinkraus | 1/1 |
| 6,718,328 B1* | 4/2004 | Norris | 709/229 |
| 6,922,691 B2 | 7/2005 | Flank | |
| 7,072,890 B2* | 7/2006 | Salerno et al. | 707/711 |
| 7,149,732 B2 | 12/2006 | Wen et al. | |
| 7,194,454 B2 | 3/2007 | Hansen et al. | |
| 7,877,480 B2* | 1/2011 | Wardrop | 709/225 |
| 2005/0120211 A1* | 6/2005 | Yokoyama | 713/168 |
| 2008/0040094 A1* | 2/2008 | Wolgemuth et al. | 704/2 |
| 2008/0077570 A1 | 3/2008 | Tang et al. | |
| 2009/0089278 A1* | 4/2009 | Poola et al. | 707/5 |
| 2009/0327304 A1* | 12/2009 | Agarwal et al. | 707/10 |

OTHER PUBLICATIONS

Anick, "Using Terminological Feedback for Web Search Refinement—A Log-based Study", retrievd on Oct. 23, 2008 at <<http://portal.acm.org/ft_gateway.cfm?id=860453&type=pdf&coll=GUIDE&dl=GUIDE&CFID=7442126&CFTOKEN=59944993>>, ACM SIGIR'03 (1-58113-646-3/03/0007), 2003, pp. 88-95.

Baeza-Yates, et al., "Query Clustering for Boosting Web Page Ranking", retrieved on Oct. 23, 2008 at <<http://www.springerlink.com/content/p4v0vatky85aj2f7/fulltext.pdf>>, Springer-Verlag: AWIC 2004 (LNAI 3034), 2004, pp. 164-175.

Bedi, et al., "Improving Information Retrieval Precision using Query Log Mining and Information Scent", retrieved on Oct. 23, 2008 at <<http://www.ansijournals.com/itj/2007/584-588.pdf>>, Information Technology Journal, vol. 6, No. 4, 2007, pp. 584-588.

Beeferman, et al., "Agglomerative Clustering of a Search Engine Query Log", retrieved on Oct. 23, 2008 at <<http:// delivery.acm.org/10.1145/350000/347176/p407-beeferman.pdf?key1=347176&key2=4078374221&coll=GUIDE&dl=GUIDE&CFID=7444227&CFTOKEN=99027375>>, ACM KDD 2000 (1-58113-233-6/00/08), 2000, pp. 407-416.

(Continued)

*Primary Examiner* — Cheryl Lewis
(74) *Attorney, Agent, or Firm* — Lee & Hayes, PLLC

(57) ABSTRACT

Techniques described herein allow for suggesting creation of tools for improving search engine performance. Specifically, these tools focus on producing more relevant search engine results via a URL-based query clustering method. These tools first extract tokens from Uniform Resource Locators associated to search queries. With these tokens, these tools form query clusters of common tokens. The resulting clusters can be used to help understand the similarities in user search queries via URL-based cluster queries to produce more relevant search results.

20 Claims, 4 Drawing Sheets

OTHER PUBLICATIONS

Beitzel, et al., "Automatic Web Query Classification using Labeled and Unlabeled Training Data", retrieved on Oct. 23, 2008 at <<http://www.ir.iit.edu/publications/downloads/p294-beitzel.pdf>>, ACM SIGIR'05 (1-59593-034-5/05/0008), 2005, pp. 581-582.

Beitzel, et al., "Improving Automatic Query Classification via Semi-supervised Learning", retrieved on Oct. 23, 2008 at <<http://www.ir.iit.edu/publications/downloads/beitzels-Classification.pdf>>, IEEE ICDM '05, 2005, pp. 42-29.

Beitzel, et al., "Varying Approaches to Topical Web Query Classification", retrieved on Oct. 23, 2008 at <<http://delivery.acm.org/10.1145/1280000/1277907/p783-beitzel.pdf?key1=1277907&key2=4488374221&coll=GUIDE&dl=GUIDE&CFID=7444384&CFTOKEN=48907363>>, ACM SIGIR'07 (978-1-59593-597-7/07/0007), 2007, pp. 783-784.

Broder, et al., "Robust Classification of Rare Queries using Web Knowledge", retrieved onn Oct. 23, 2008 at <<http://delivery.acm.org/10.1145/1280000/1277783/p231-broder.pdf?key1=1277783&key2=3519374221&coll=GUIDE&dl=GUIDE&CFID=7444827&CFTOKEN=53527331>>, ACM SIGIR'07 (978-1-59593-597-7/07/0007), 2007, pp. 231-238.

Burges, et al., "Learning to Rank Using Gradient Descent", retrieved on Oct. 23, 2008 at <<http://delivery.acm.org/10.1145/1110000/1102363/p89-burges.pdf?key1=1102363&key2=3429374221&coll=GUIDE&dl=GUIDE&CFID=7444954&CFTOKEN=36662799>>, ACM ICML '05, 2005, pp. 89-96.

Chan, et al., "Clustering Search Engine Query Log Containing Noisy Clickthroughs", retrieved on Oct. 24, 2008 at <<http://ieeexplore.ieee.org/stamp/stamp.jsp?arnumber=01266134>>, IEEE Saint'04 (0-7695-2068-5/04), 2004, pp. 305-308.

Chien, et al., "Semantic Similarity between Search Engine Queries using Temporal Correlation", retrieved on Oct. 23, 2008 at <<http://www2005.org/cdrom/docs/p2.pdf>>, ACM WWW 2005 (1-59593-046-9/05/0005), 2005, pp. 2-11.

Chuang, et al., "Towards Automatic Generation of Query Taxonomy: A Hierarchical Query Clustering Approach", IEEE International Conference on Data Mining, 2002, 8 pages.

Cui, et al., "Probabilistic Query Expansion using Query Logs", retrieved on Oct. 23, 2008 at <<http://research.microsoft.com/jrwen/jrwen_files/publications/QE-WWW2002.pdf>>, ACM WWW 2002 (1-58113-449-5/02/0005), 2002, pp. 325-332.

Fitzpatrick, et al., "Automatic Feedback using Past Queries: Social Searching?", retrieved on Oct. 23, 2008 at <<http://delivery.acm.org/10.1145/260000/258597/p306-fitzpatrick.pdf?key1=258597&key2=3700474221&coll=GUIDE&dl=GUIDE&CFID=7665436&CFTOKEN=35208353>>, ACM SIGIR '97 (0-89791-836-3/97/7), 1997, pp. 306-313.

Gravano, et al., "Categorizing Web Queries According to Geographical Locality", retrived on Oct. 23, 2008 at <<http://www1.cs.columbia.edu/gravano/Papers/2003/cikm03.pdf>>, ACM CIKM'03 (1-58113-723-0/03/0011), 2003, pp. 325-333.

Hearst, et al., "Reexamining the Cluster Hypothesis: Scatter/Gather on Retrieval Results", retrieved on Oct. 24, 2008 at <<http://people.ischool.berkeley.edu/hearst/papers/sg-sigir96/sigir96.html>>, ACM SIGIR '96, 1996, pp. 76-84.

Jarvelin, et al., "IR Evaluation Methods for Retrieving Highly Relevant Documents", retrieved on Oct. 23, 2008 at <<http://www.info.uta.fi/tutkimus/fire/archive/KJJKSIGIR00.pdf>>, ACM SIGIR (1-58113-226-3/00/007), 2000, 41-48.

Jones, et al., "Generating Query Substitutions", retrieved on Oct. 23, 2008 at <<http://www.cs.cmu.edu/rosie/papers/jones-www2006-generating-query-subs.pdf>>, ACM IW3C2 WWW 2006 (1-59593-323-9/06/0005), 2006, pp. 387-396.

Kang, et al., "Query Type Classification for Web Document Retrieval", retrieved on Oct. 23, 2008 at <<http://delivery.acm.org/10.1145/870000/860449/p64-kang.pdf?key1=860449&key2=9730474221&coll=GUIDE&dl=GUIDE&CFID=7446652&CFTOKEN=48657202>>, ACM SIGIR'03 (1-58113-646-3/03/0007), 2003, pp. 64-71.

Mitra, et al., "Improving Automatic Query Expansion", retrieved on Oct. 23, 2008 at <<http://delivery.acm.org/10.1145/300000/290995/p206-mitra.pdf?key1=290995&key2=6440474221&coll=GUIDE&dl=GUIDE&CFID=7446754&CFTOKEN=83792002>>, ACM SIGIR '98 (1-58113-015-58/98), 1998, pp. 206-214.

Qiu, et al., "Concept based Query Expansion", retrieved on Oct. 23, 2008 at <<http://delivery.acm.org/10.1145/170000/160713/p160-qiu.pdf?key1=160713&key2=1490474221&coll=GUIDE&dl=GUIDE&CFID=7447430&CFTOKEN=95153645>>, ACM SIGIR'93 (0-89791-605-0/93/0006/0160), 1993, pp. 160-169.

Raghavan, et al., "On the Reuse of Past Optimal Queries", retrieved on Oct. 23, 2008 at <<http://delivery.acm.org/10.1145/220000/215381/p344-raghavan.pdf?key1=215381&key2=6701474221&coll=GUIDE&dl=GUIDE&CFID=7447593&CFTOKEN=50811153>>, ACM SIGIR'95 (0-89791-714-6/95/07), 1995, pp. 344-350.

Ruthven, "Re-examining the Potential Effectiveness of Interactive Query Expansion", retrieved on Oct. 23, 2008 at <<http://delivery.acm.org/10.1145/870000/860475/p213-ruthven.pdf?key1=860475&key2=8311474221&coll=GUIDE&dl=GUIDE&CFID=7667167&CFTOKEN=32513865>>, ACM SIGIR'03 (1-58113-646-3/03/0007), 2003, pp. 213-220.

Sahami, et al., "A Web-based Kernel Function for Measuring the Similarity of Short Text Snippets", retrieved on Oct. 23, 2008 at <<http://delivery.acm.org/10.1145/1140000/1135834/p377-sahami.pdf?key1=1135834&key2=9811474221&coll=GUIDE&dl=GUIDE&CFID=7447798&CFTOKEN=66427167>>, ACM IW3C2 WWW 2006 (1-59593-323-9/06/0005), 2006, pp. 377-386.

Shen, et al., "Q2C©UST: Our Winning Solution to Query Classification in KDDCUP 2005", retrieved on Oct. 23, 2008 at <<http://www.sigkdd.org/explorations/issues/7-2-2005-12/KDDCUP2005Report_Shen.pdf>>, ACM SIGKDD Explorations Newsletter, vol. 7, No. 2, 2005, pp. 100-110.

Shen, et al., "Query Enrichment for Web-Query Classification", retrieved on Oct. 23, 2008 at <<http://portal.acm.org/ft_gateway.cfm?id=1165776&type=pdf&coll=GUIDE&dl=GUIDE&CFID=7448233&CFTOKEN=23272727>>, ACM (1046-8188/06/0700-0320), vol. 24, No. 3, 2006, pp. 320-352.

Terra, et al., "Scoring Missing Terms in Information Retrieval Tasks", retrieved on Oct. 23, 2008 at http://delivery.acm.org/10.1145/1040000/1031182/p50-terra.pdf?key1=1031182&key2=8551474221&coll=GUIDE&dl=GUIDE&CFID=7667899&CFTOKEN=16242599>>, ACM CIKM'04 (1-58113-874-1/04/0011), 2004, pp. 50-58.

Tongchim, et al., "Mining Query Logs for Improving Search Efficiency", retrieved on Oct. 23, 2008 at <<https://dspace.jaist.ac.jp/dspace/bitstream/10119/4074/1/10.pdf>>, JAIST Press: KICSS 2007, 2007, pp. 1-8.

Vlachos, et al., "Identifying Similarities, Periodicities and Bursts for Online Search Queries", retrieved on Oct. 23, 2008 at <<http://delivery.acm.org/10.1145/1010000/1007586/p131-vlachos.pdf?key1=1007586&key2=4361474221&coll=GUIDE&dl=GUIDE&CFID=7668035&CFTOKEN=58251561>>, ACM SIGMOD, 2004, pp. 131-142.

Voorhees, "Query Expansion using Lexical-Semantic Relations", retrieved on Oct. 23, 2008 at <<http://delivery.acm.org/10.1145/190000/188508/p61-voorhees.pdf?key1=188508&key2=5271474221&coll=GUIDE&dl=GUIDE&CFID=7448749&CFTOKEN=50561460>>, Springer Verlag: ACM SIGIR'94, 1994, pp. 61-69.

Wen, et al., "Clustering User Queries of a Search Engine", retrieved on Oct. 23, 2008 at <<http://delivery.acm.org/10.1145/380000/371974/p162-wen.pdf?key1=371974&key2=1191474221&coll=GUIDE&dl=GUIDE&CFID=7448881&CFTOKEN=71441897>>, ACM WWW10 (1-58113-348-0/01/0005), 2001, pp. 162-168.

Wen, et al., "Query Clustering using Content Words and User Feedback", retrieved on Oct. 23, 2008 at <<http://delivery.acm.org/10.1145/390000/384083/p442-wen.pdf?key1=384083&key2=2891474221&coll=GUIDE&dl=GUIDE&CFID=7668553&CFTOKEN=17986016>>, ACM SIGIR'01 (1-58113-331-6/01/0009), 2001, pp. 442-443.

Xu, et al., "Query Expansion using Local and Global Document Analysis", retrieved on Oct. 23, 2008 at <<http://delivery.acm.org/10.1145/250000/243202/p4-xu.pdf?key1=243202

&key2=9602474221&coll=GUIDE&dl=GUIDE&CFID=7668662&CFTOKEN=53644426>>, ACM SIGIR'96 (0-89791-792-8/96/08), 1996, pp. 4-11.

Zhang, et al., "Mining Search Engine Query Logs for Query Recommendation", retrieved on Oct. 23, 2008 at <<http://www.ra.ethz.ch/CDstore/www2006/devel-www2006.ecs.soton.ac.uk/programme/files/pdf/p214.pdf>>, ACM WWW 2006 (1-59593-332-9/06/0005), 2006, pp. 1039-1040.

Zhao, et al., "Time-Dependent Semantic Similarity Measure of Queries using Historical Click-through Data", retrieved on Oct. 23, 2008 at <<http://delivery.acm.org/10.1145/1140000/1135858/p543-zhao.pdf?key1=1135858&key2=1922474221&coll=GUIDE&dl=GUIDE&CFID=7449787&CFTOKEN=56767191>>, ACM IW3C2 WWW 2006 (1-59593-323-9/06/0005), 2006, pp. 543-552.

* cited by examiner

RANKING ORIENTED QUERY CLUSTERING AND APPLICATIONS

BACKGROUND

Search engines serve to locate information both on the World Wide Web and off. For example, search engines search for documents with keywords and return a list of the documents where the keyword was found. Search engines routinely index billions of documents in this manner, which gives users a way to find documents by entering a keyword search query.

However, search engines do not always return the most relevant results in order. A user may enter a search query with a specific intent of the results she wants, but often times the desired documents are not highly ranked. This is typically because a search engine only reads meta-tags or only the first few hundred words of the document text which does not allow accurate result ranking.

While existing search engine technology has proven very useful, there remains ample room for improvement of search engine technology.

SUMMARY

This document describes tools for improving search engine performance. Specifically, these tools focus on producing more relevant search engine results via a URL-based query clustering method. These tools first extract tokens from Uniform Resource Locators associated to search queries. With these tokens, these tools form query clusters of common tokens. The resulting clusters can be used to help understand the similarities in user search queries via URL-based cluster queries to produce more relevant search results.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

This document describes tools for associating two or more search queries whose search results produce similar Uniform Resource Locators (URLs). The association is produced via URL-based query clusters. These clusters are comprised of common tokens created from URL search results.

The association is useful because URLs that share common tokens typically refer to topics that are relevant to each other. Associating the search queries can aid in revealing a user's actually intent behind a search query.

Common tokens from URLs are useful in generating this association because they typically reflect a significant amount of information about the topic they refer to. Even though URLs are composed of a limited amount of text in comparison to, for example, actual text on a page that the URL refers to, URLs are typically very carefully designed by web masters to accurately represent the content of the topic. Thus tokens are rich in semantics hints. For example, URLs with common tokens typically pertain to relevant pages from the same domains or have common contents.

In this manner, a first search query producing certain tokens is associated with a query cluster created from search queries with tokens that are similar to the tokens produced by the first search query. From the resulting query cluster information, data can be extracted to reveal a user's true intent in order to provide more accurate search results. In one embodiment, first common token clusters are created from a plurality of URLs produced from a plurality of search queries. A developer then assigns category names (such as "movie actors," "social network sites," etc.) to each cluster. These query cluster categories yield valuable information. Specifically, analysis of query cluster categories can for example, yield user popularity of specific clusters. With this information, search engine query output can then be re-ranked to produce more relevant search results.

The claimed tools therefore provide for a method to provide more relevant search results based on query clusters created from common URL tokens from a plurality of search queries.

The discussion begins with a section entitled "Illustrative Architecture", which describes one non-limiting environment that may implement the claimed tools. A second and final section, entitled "Illustrative Processes", describes processes for creating and employing query clusters illustrated in the architecture of FIG. 1 as well as other architectures.

This brief introduction, including section titles and corresponding summaries, is provided for the reader's convenience and is not intended to limit the scope of the claims, nor the proceeding sections.

Illustrative Architecture

Figure 1:
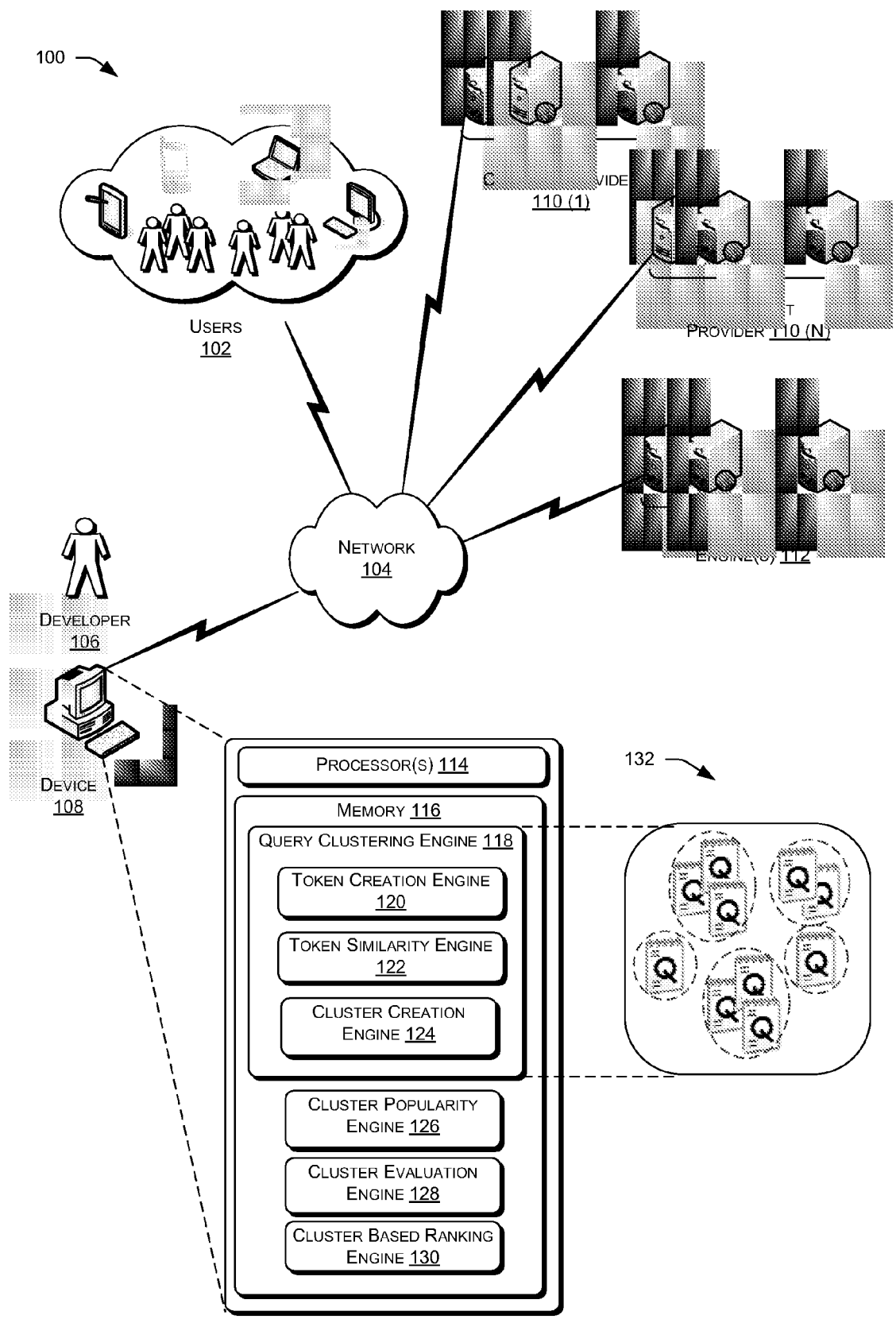
FIG. 1 depicts an illustrative architecture in which a query clustering engine creates query clusters via common tokens.

FIG. 1 depicts an illustrative architecture 100 that may employ the described techniques. As illustrated, FIG. 1 includes one or more users 102 operating computing devices for at least the purpose of using search engines and uploading and downloading content over a network 104. The computing devices may comprise any sort of device capable of using search engines and uploading and downloading content. For instance, the devices may include personal computers, laptop computers, mobile phones, set-top boxes, game consoles, personal digital assistants (PDAs), portable media players (PMPs) (e.g., portable video players (PVPs) and digital audio players (DAPs)), and the like. Note that network 104, which couples the user computing devices, may comprise the Internet, a Local Area Network (LAN), a Wide Area Network (WAN), a wireless network, and/or the like.

Additionally, FIG. 1 illustrates content providers 110(1), 110(N) and search engine(s) 112. Content providers 110(1) and 110(N) comprise any sort of entity (e.g., databases, websites, etc.) that can store files such as text documents, multimedia, web pages and other files that can be indexed by search engine(s) 112.

FIG. 1 also illustrates developer 106. In this non-limiting example, developer 106 uses a device 108 to run the query clustering method and execute related applications. In other embodiments, the method can be run on multiple devices locally, run remotely or run on a combination thereof.

As illustrated, device 108 includes one or more processors 114, as well as memory 116, upon which a query clustering engine 118 may reside. Query clustering engine 118 serves to cluster queries via common URL tokens as illustrated in result 132. Query clustering engine 118 may include token creation engine 120, token similarity engine 122 and cluster creation engine 124.

Computing device 108 meanwhile may include a cluster popularity engine 126, cluster evaluation engine 128, and a cluster based ranking engine 130. These engines serve to utilize the query clusters created by query clustering engine 118.

In non-limiting architecture of FIG. 1, developer 106 runs query clustering engine 118 on device 108. Query clustering engine 118 serves to cluster queries via common URL tokens produced from the results of a plurality of queries. Query clustering is useful as queries belonging to the same query cluster category often produce search results that are relevant to each other. For instance, queries in the same cluster are often from the same domains and/or relate to the same general topic.

Query clustering typically begins when the developer submits a query to search engine(s) 112. Search engine(s) 112 has previously indexed a plurality of files from content providers 110(1) and 110(N) and returns search results with corresponding URLs to query clustering engine 118 on device 108. Token creation engine 120 then extracts tokens from the URLs. In one embodiment, token creation engine breaks a URL into fragments that may be comprised of words, numbers etc that are used to form tokens. These tokens serve to carry useful information about the content of the location that the URL points to such as a domain name and/or specific topic. By being breaking the URL into fragments, analysis of the URL as well as comparisons to other URLs can be more easily done. Token similarity engine 122 then determines common token that are shared by URLs produced by other search queries.

Cluster creation engine 124 analyzes the resulting common token search queries and then groups them with their corresponding search queries into query clusters. A graphical illustration is represented in results 132. Results 132 illustrate multiple search queries clustered together with other search queries that share common tokens. (See FIG. 2-4).

Once result 132 is attained, clusters are named and applications such as cluster popularity engine 126, cluster evaluation engine 128 and cluster based ranking engine 130 can then be applied to utilize results 132. Cluster popularity engine 126 serves to analyze clusters to reflect user intent via the query clusters. Cluster evaluation engine serves to aid in evaluating cluster information. For instance, specific clusters may contain cluster specific issues such as particularity relevant sites. Cluster ranking engine aids in re-ranking search results via cluster specific information. These engines can ultimately use the query clustering to provider the users operating computing devices 102 with more relevant search results.

Illustrative Processes

Figure 2:
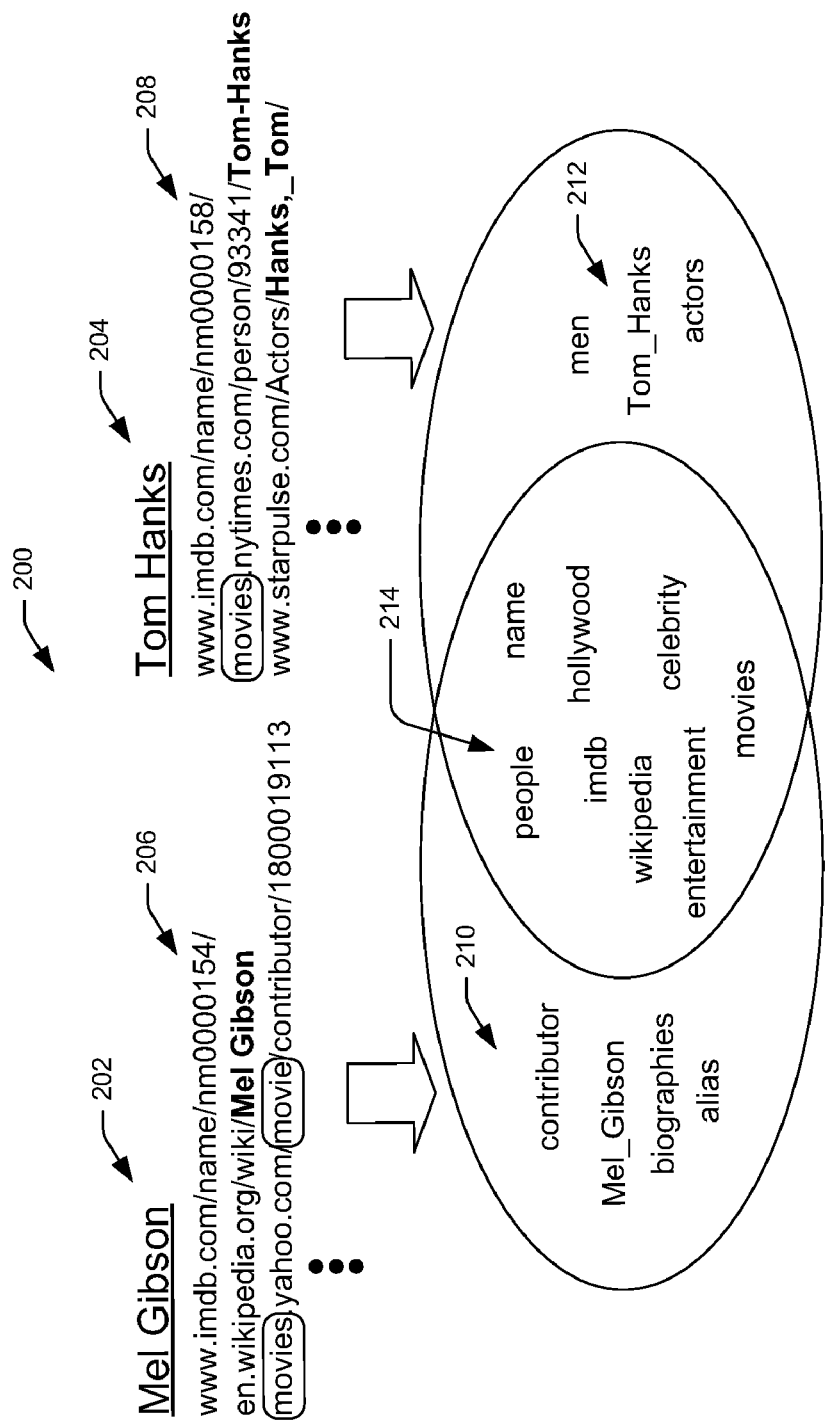
FIG. 2 depicts the grouping of common URL tokens created from the search queries "Mel Gibson" and "Tom Hanks".

FIG. 2 depicts a method 200, of grouping two URLs in a common query cluster. The URLs may have been produced by search engines in response to search queries. This method is typically executed by the developer 106 via device 108. Device 108 would typically use query clustering engine 118 and this engine's modules (token creation engine 120, token similarity engine 122 and cluster creation engine 124) to create query clusters.

Referring to FIG. 2, developer 106 begins to create clusters by entering search queries. In this non-liming example, search queries 202 "Mel Gibson" and 204 "Tom Hanks" are entered into device 108. Device 108 then submits the queries to search engine 112. In other embodiments, multiple search engines may be used. Search engine 112 then returns URLs 206 and 208 which correspond to search queries 202 and 204 respectively. These URLs were previously indexed by the search engine from content providers 110(1) and 110(N). Of course, while the current example describes comparing one URL that search engine 112 returns for each search query (e.g., the top-ranking URL), other embodiments compare multiple URLs for each search query. For instance, method 200 could compare the top-ten URLs for "Mel Gibson" with the top ten URLs for "Tom Hanks." Furthermore, while method 200 describes comparing URLs for two search queries, other embodiments may compare URLs from hundreds, thousands, or many, many more search queries.

Tokens serve to carry useful information about the content of the page the URL points to such as a domain name and/or specific topics. In the illustrated example, token creation engine 120 extracts tokens from the URLs once the URLs are received. The URLs are broken into tokens because URLs are rich in meaningful semantic hints pertaining to the content of the location they refer to. For example, "Movie" is a common token among sites that deal with movie stars. "imdb"® (Internet Movie DataBase) can further distinguish queries on movies as this site hosts professional databases regarding movies. In other embodiments, instead of using only URLs, sources snippets, titles and clicked URLs with search URLs are also used to create tokens.

In one embodiment, the URL is first separated into parts by token creation engine 120 by using predefined separators such as slashes, dots, dashes and hyphens. Second, numbers (other than domain names) and URL stop-words such as "com", "net", "index" and "php" are removed. Third, identical tokens in both lower case and uppercase are merged. For example, the URL: movies.nytimes.com/person/93341/Tom-Hanks is first separated into: movies, nytimes, com, person, 93341, Tom and Hanks. The number "93341" and the URL stop-word "com" are removed to get the tokens: movies, nytimes, person, Tom and Hanks.

For instance, a desired number of selected URLs are chosen as $u_{i1}, u_{i2}, \ldots u_{ik}$ to represent a query as follows:

$$E(q_i) = (u_{i1}, u_{i2}, \ldots, u_{ik})$$

The URLs are then converted into tokens by the token creation engine 116 and yield:

$$\Phi(u_j) = (t_{j1}, t_{j2}, \ldots, y_{jl})$$

Token similarity engine 122 is then used to find similarities between the resulting tokens belonging to the different URLs. In non-limiting examples, either a vector space model or a set model can be used to find similarities between URLs belonging to two different search queries as well as URLs belonging to the same search query.

In the vector space model embodiment, the tokens are merged as if in a "bag" of tokens in a similar manner to using a vector space model in information retrieval. Then cosine similarity is used to measure the similarity between the tokens belonging to two search queries.

Here, the query is represented by a certain number (k) of URLs. In this manner, a query becomes similar to a document in information retrieval. The query $q_i$ is represented by:

$$q_i^{\rightarrow} = <w_{i1}, w_{i2} w_{in}>$$

Here, $w_{ij}$ is the weight of token $t_j$ in $q_i$. The focus of Term Frequency-Inverse Document Frequency (TF-IDF) is to calculate the weights as follows:

$$w_{ij} = TF_{ij} * IDF_j$$

$TF_{ij}$ is a term frequency (such as how many times the token $t_j$ occurs in the query document $q_i$. The document frequency is then counted upon all query documents and then the $IDF_j$ is calculated as follows:

$$IDF_3 = \log \frac{|Q|}{|\{q_i : t_3 \in q_i\}|}$$

Here, the denominator stands for the number of query document that contain token $t_j$, and $|Q|$ is the number of all query documents.

Cosine similarity is then applied to measure query similarity via:

$$\text{Similarity}_{vector}(\vec{q_1}, \vec{q_2}) = \cosine(\vec{q_1}, \vec{q_2})$$

In contrast, in the vector space model embodiment, the set model keeps local information by treating each URL as a point in vector space. Thus a query is denoted by a set of points. Then a function is used to calculate the similarity between two sets or queries.

Here, the focus is on the most similar parts of the returned URLs. Thus, we represent a query as a set of URLs. Each URL is denoted as a vector of tokens with TF-IDF weights as a query vector in Vector Space Model via:

$$q_i = \vec{u_{i1}}\vec{u_{i2}}, \ldots, \vec{u_{il}}$$

Then, we calculate the similarity between a pair of URL vectors via:

$$\text{Similarity}_{vector}(\vec{u_{ij}}, \vec{u_{ik}}) = \cosine(\vec{u_{ij}}, \vec{u_{ik}})$$

Then, the similarity between queries as the sum of the m largest similarities of URL pairs is found via:

$$\text{Similarity}_{set}(q_1, q_2) = \sum \max_m \{\text{Similarity}_{vector}(\vec{u_{ij}}, \vec{u_{ik}})\}$$

In one example, for the search queries 202($q_1$) and 204 ($q_2$), if k=3 and m=2, the similarities of the 3*3 URL pairs between $q_1$ and $q_2$, are calculated. Then the resulting similarities are sorted and the largest two are selected. Finally, the sum of these two similarities becomes the similarity of the two queries. In this hierarchical clustering, the similarity between two clusters is defined as the largest similarity between their members. Cluster creation engine 124 then analyzes the resulting common tokens. During this analysis, each query is assigned to a distinct cluster based on the similarity of its tokens.

Thus, unsupervised query clustering of method 200 is used to group search queries. In other embodiments the clustering can be supervised in which a developer would play an active role in making clustering decisions. In these embodiments, queries are not necessarily classified into a fixed taxonomy. Unsupervised clustering offers the flexibility to be able to detect new clusters that users are becoming interested in. In other words, common tokens are found from URLs, the URLs are clustered according to those common tokens and then a developer examines and then categorizes the new cluster.

In one experiment, it was observed that URL-based clustering tends to produce two kinds of clusters. One kind of cluster is site related clusters. These clusters exhibit the queries that are related to a popular site. In one non-limiting example, the website Yahoo® is related to both "Yahoo® mail" and "Yahoo® search". Thus, these tokens would be clustered together, because they have the same domain name.

A second kind of cluster that URL-based clustering creates is topical clusters. Topical clusters contain search queries with the same topic such as "movie stars." For example, "Mel Gibson" and "Tom Hanks" are both movie stars.

Figure 3:
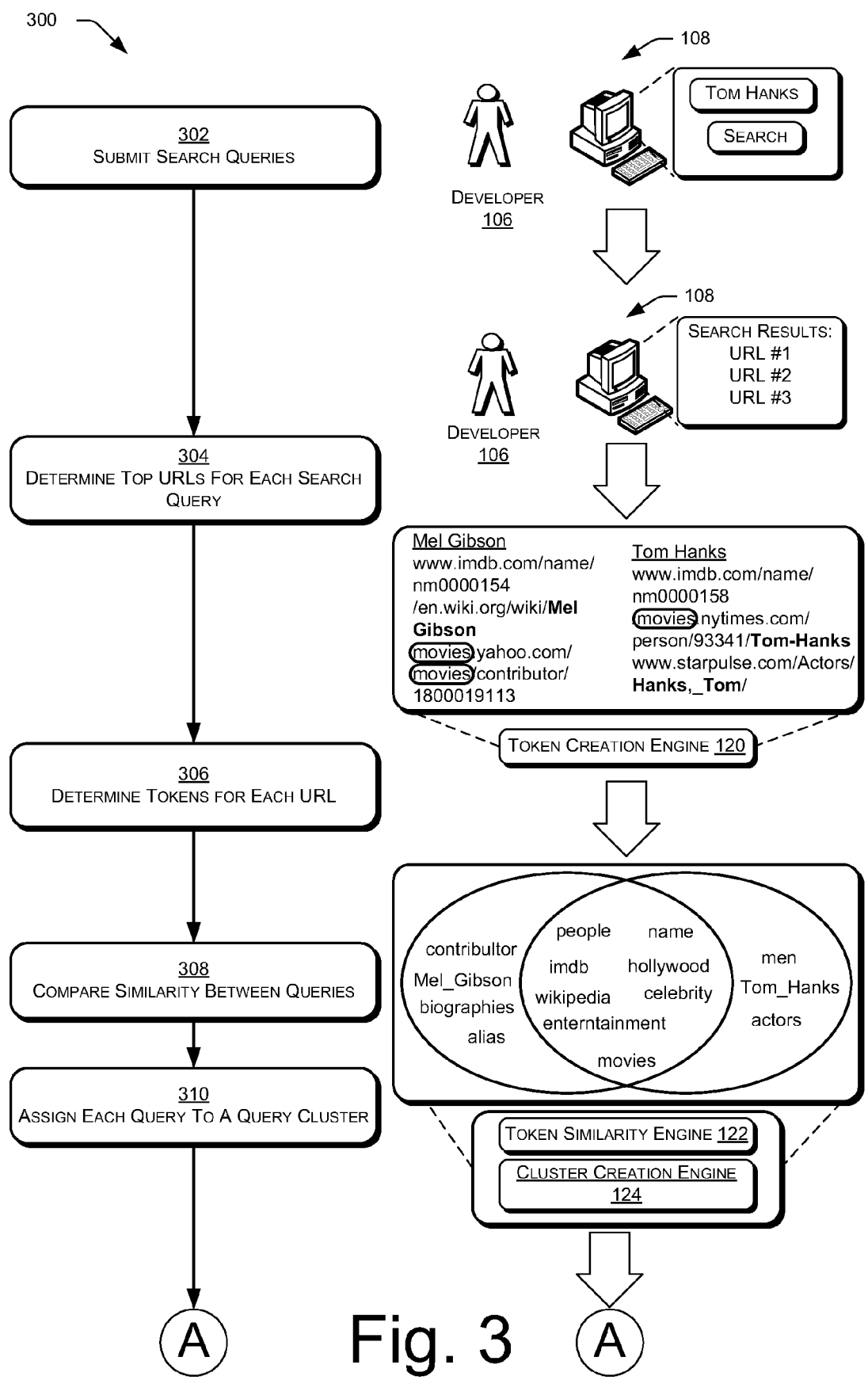
FIGS. 3-4 depict an illustrative process for creation of query cluster categories and ultimately re-ranking search query outputs based on query cluster categories.
Figure 4:
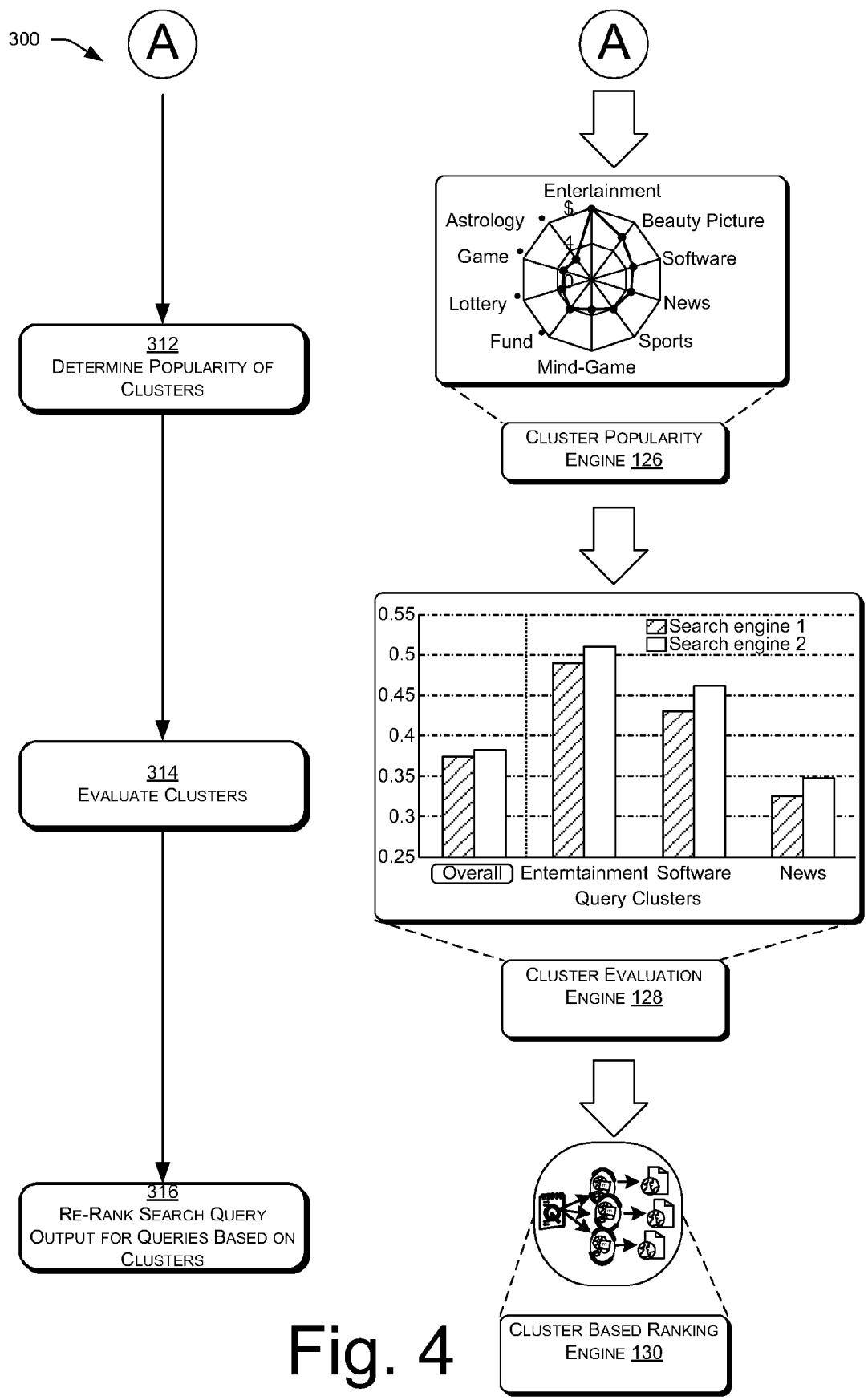

FIGS. 3-4 depict an illustrative process 300 for creation of cluster categories and ultimately re-ranking search query outputs based on query cluster categories. As illustrated in this non-limiting example, a developer 106 initiates the process to create cluster categories. This is done by a plurality of search queries such as search query "Tom Hanks." These queries are submitted at 302. Developer 106 may submit the searches via device 108. The query is submitted to at least one search engine which has previously indexed at least one content provider.

At 304, the top URLs are determined for each search query. The top URLs can be determined in a multitude of ways. For instances, the top URLs may be determined based on an order of the URLs returned by the search engine. Additionally or alternatively, the top URLs may be determined based on the developer 106's own judgment regarding relevancy, popularity or similar factors. Other methods would be known to those skilled in the art. In addition, the exact number of URLs to be used can vary according to the desired complexity of the search.

At 306, the common tokens are determined for each URL (see FIG. 2) via token similarity engine 120.

Moving onto 308 and 310, token similarities between queries are compared and each query is assigned to a cluster category based on those similarities (see FIG. 2). Step 308 is typically done via token similarity engine 122 and step 310 is typically done by cluster creation engine 124.

Process 300 continues onto FIG. 4 at step 312, at which the popularity of the clusters can be determined as illustrated via cluster popularity engine 126.

Cluster popularity serves to reflect user intent via the query clusters. This application seeks to understand "what users search for." User intent can be tracked in spatial and temporal dimensions. In one embodiment, this is done before selecting clusters for evaluation and ranking.

In one embodiment, at least one dataset is submitted to a search engine. The URL based query clustering method is applied to the results to yield query clusters. The query clusters are then given category names. Then the sum of query frequency is then calculated to represent the hotness of query clusters. The popularity or hotness ($H_i$) of each cluster is then calculated below:

$$H_i = \frac{\sum_{q \in C_4} f_q}{\sum_{q \in Q_m} f_q}$$

Here, the frequency $f_q$ of each query q from the cluster $C_l$ is summed together. In this embodiment, the summed frequency is then normalized by the total frequency of queries in the query set $Q_m$. In this non-limiting example, the top 10 clusters are picked based upon their hotness.

One of the ways user intent or cluster popularity can be tracked is by examining the spatial difference of user intent. For instance, users' search behavior can vary by specific country. Knowing country-specific user intent will aid in determining user intent in specific markets. A benefit of URL clustering is that URLs are uniform regardless of what language the content that the URL refers to is written in. In one embodiment, the differences of user intents in China versus the United States was conducted. From this method, it was ascertained that Chinese users were more interested in query clusters pertaining to "beauty pictures" and "software." As opposed to U.S. users who were not nearly as interested in these clusters.

Another method user intent can be tracked is by examining temporal changes of user intent. Specifically, it is useful to know what users are interested in at certain times as user intent may be time specific. Thus, URL query clustering can reveal user intent over time. For instance, user intent often changes with real-life events. For example, in China, users constantly seek search results in "beauty picture" clusters, however, user interest in, the movie "Lust, Caution" occurred only in the top ten clusters in November and December—which happens to be just after the movie was released.

At step 314, the query clusters are evaluated as illustrated according to different search engines that produced the URLs via cluster evaluation engine 128. Additionally, it is useful to focus on evaluating information within a specific query cluster. For instance, specific clusters may contain cluster specific issues such as particularity relevant sites.

In one embodiment, evaluating search engine query results via query clusters begins with selecting queries along with their query frequency. Query clusters are produced as above. The clusters are given category names and the desired clusters are selected for evaluation.

Two commercial search engines are used to show query clustering's evaluation ability. The ranking performance is evaluated by Normalized Discounted Cumulative Gain (NDCG). This method yields information on the ranking of highly relevant results. Given a query, the search results retuned by the search engine are annotated with five tiers from "perfect match" to "bad match." The NDCG at K is computed via:

$$N_q = M_q \sum_{i=1}^{K} (2^{r(i)} - 1)/\log(1 + i)$$

Where $M_q$ is a normalization constant calculated so that a perfect ordering receives an NDCG of 1 and each r(i) is an integer relevant label ("perfect match"=5 to "bad match"=1) of a result at position i.

By examining the NDCG scores from different clusters from the two search engines—search engine performance can be evaluated.

Finally, at step 316, the search queries from a search engine are re-ranked as shown in 330, using query clusters via cluster based ranking engine 130. Query cluster re-ranking seeks to improve ranking in combination with a general model to yield more relevant search results. This can be accomplished in an off-line method.

First, in the off-line method, useful cluster ranking features are added for specific clusters. In one embodiment, when a user submits a search query it is determined whether it is associated to a specific cluster. If it is, then the specific model can be used to assist in ranking returned search results.

These features are may be determined in steps 320 (determining the popularity of clusters) and/or 324 (evaluating clusters). These features permit, training cluster-specific model to aid in ranking. In addition, features can be extracted from sites such as site importance for a specific cluster to further train the specific model for the cluster.

In one embodiment, search results are returned in response to a search query via a search engine. Then the category the query belongs to is determined. This determination can be done via a sorted cluster label that is mined off-line in a quick-search table. Another method is to use a query classifier. A specific query cluster model is associated to that search query. The search results are then re-ranked by the specific model. This supplementation of generic search results with cluster specific information significantly improves the relevancy of the returned search results.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What we claim:

1. A method of associating a search query to a cluster comprising:
    receiving a Uniform Resource Locator (URL) returned in response to a search based on a search query;
    extracting a first set of tokens from the URL, wherein the extracting comprises:
        i. splitting the URL by predefined separators;
        ii. removing URL stop-words; and
        iii. merging identical tokens;
    determining a similarity between the first set of tokens and each of multiple set of tokens extracted from multiple other URLs returned in response to other search queries; and
    associating the search query with a cluster, wherein the associating is based at least in part on the similarities between the first set of tokens and each of the multiple set of tokens extracted from the other URLs.

2. The method of claim 1, wherein the determining the similarity between the first set of tokens and each of a multiple set of tokens utilizes a vector space model.

3. The method of claim 1, wherein the determining the similarity between the first set of tokens and each of a multiple set of tokens utilizes a set model.

4. The method of the claim 1, further comprising assigning the cluster to a cluster category.

5. The method of claim 1, wherein the tokens are words extracted from a URL.

6. A method of associating a search query to a cluster comprising:
    receiving a Uniform Resource Locator (URL) returned in response to a search based on a search query;
    extracting a first set of tokens from the URL;
    determining a similarity between the first set of tokens and each of a multiple set of tokens extracted from multiple other URLs returned in response to other search queries; and
    associating the search query with a cluster, wherein the associating is based at least in part on the similarities between the first set of tokens and each of the multiple set of tokens extracted from the other URLs.

7. The method of the claim 6, wherein the extracting comprises:
    splitting the URL by predefined separators; and
    removing numerical characters.

8. The method of the claim 6, wherein the extracting further comprises removing URL stop-words.

9. The method of the claim 6, wherein the extracting further comprises merging identical tokens.

10. The method of claim 6, wherein the determining the similarity between the first set of tokens and each of a multiple set of tokens utilizes a set model.

11. The method of the claim 6, further comprising assigning the cluster to a cluster category.

12. The method of claim 6, wherein the tokens are words extracted from a URL.

13. The method of the claim 6, further comprising determining relevant websites for a specific cluster.

14. One or more computer-readable media storing computer-executable instructions that, when executed on one or more processors, perform acts comprising:
   extracting a first set of tokens from a Uniform Resource Locator (URL), wherein the extracting comprises:
      i. splitting the URL by predefined separators; and
      ii. removing numerical characters;
   determining a similarity between the first set of tokens and each of a multiple set of tokens extracted from multiple other URLs; and
   associating the search query with a cluster, wherein the associating is based at least in part on the similarities between the first set of tokens and each of the multiple set of tokens extracted from the other URLs.

15. One or more computer-readable media as recited in claim 14, wherein the extracting further comprises removing URL stop-words.

16. One or more computer-readable media as recited in claim 14, wherein the extracting further comprises merging identical tokens.

17. One or more computer-readable media as recited in claim 14, wherein the determining the similarity between the first set of tokens and each of a multiple set of tokens utilizes a set model.

18. One or more computer-readable media as recited in claim 14, further comprising assigning the cluster to a cluster category.

19. One or more computer-readable media as recited in claim 14, wherein the tokens are words extracted from a URL.

20. One or more computing devices comprising:
   one or more processors; and
   the one or more computer-readable media storing the computer-executable instructions as recited in claim 14.

* * * * *